United States Patent
Morikawa et al.

(10) Patent No.: US 7,275,584 B2
(45) Date of Patent: Oct. 2, 2007

(54) IMMERSION NOZZLE FOR CONTINUOUS CASTING OF STEEL AND CONTINUOUS STEEL CASTING METHOD USING SAME

(75) Inventors: Katsumi Morikawa, Fukuoka (JP); Joki Yoshitomi, Fukuoka (JP); Keisuke Asano, Fukuoka (JP); Saeko Uchida, Fukuoka (JP)

(73) Assignee: Krosakiharima Corporation, Fukuoka (JP)

( * ) Notice: Subject to any disclaimer, the term of this patent is extended or adjusted under 35 U.S.C. 154(b) by 0 days.

(21) Appl. No.: 10/569,006

(22) PCT Filed: Aug. 23, 2004

(86) PCT No.: PCT/JP2004/012079

§ 371 (c)(1),
(2), (4) Date: Feb. 21, 2006

(87) PCT Pub. No.: WO2005/018851

PCT Pub. Date: Mar. 3, 2005

(65) Prior Publication Data

US 2006/0214029 A1    Sep. 28, 2006

(30) Foreign Application Priority Data

Aug. 22, 2003   (JP) .............................. 2003-298232

(51) Int. Cl.
*B22D 11/10* (2006.01)
*B22D 41/54* (2006.01)

(52) U.S. Cl. ...................... 164/488; 164/437; 222/591; 222/606

(58) Field of Classification Search ................ 164/488, 164/437; 222/591, 606
See application file for complete search history.

(56) References Cited

U.S. PATENT DOCUMENTS 4,989,762 A * 2/1991 Ando et al. ................. 222/607

(Continued)

FOREIGN PATENT DOCUMENTS

JP         61-256961 A  * 11/1986

(Continued)

*Primary Examiner*—Kevin P. Kerns
(74) *Attorney, Agent, or Firm*—Martin Fleit; Paul D. Bianco; Fleit Kain Gibbons Gutman Bongini & Bianco, P.L.

(57) ABSTRACT

A nozzle for continuous casting of clean steel is capable of preventing adhesion of $Al_2O_3$-based inclusions to a wall surface of the inner hole of the nozzle while fully achieving an effect of a swirl vane. The swirl vane prevents drift in molten steel passing through the inner hole. The swirl vane is disposed in the inner hole. A wall surface is at least partly formed as a tubular-shaped refractory layer and is prepared by controlling a weight ratio of CaO/MgO and an apparent porosity to have a thickness of 3 to 20 mm, so as to prevent adhesion of $Al_2O_3$-based inclusions to the wall surface and the swirl vane while effectively maintaining the anti-drift effect for long hours. Further, inert gas is injected into a molten steel flow between an upper nozzle and the swirl vane to facilitate surfacing of $Al_2O_3$-based inclusions in a mold and reduce $Al_2O_3$-based inclusions in molten steel so as to achieve stable casting operation and high-quality steel with high cleanness.

18 Claims, 3 Drawing Sheets

U.S. PATENT DOCUMENTS 6,435,385 B1 * 8/2002 Marukawa et al. ......... 222/594
7,172,013 B2 * 2/2007 Ogata ........................ 164/437

FOREIGN PATENT DOCUMENTS

| JP | 1-289549 A | * | 11/1989 |
| JP | 7-24557 A | | 1/1995 |
| JP | 7-34978 | | 4/1995 |
| JP | 8-39214 A | * | 2/1996 |
| JP | 9-194253 A | | 7/1997 |
| JP | 10-263765 A | * | 10/1998 |
| JP | 2002-239690 A | * | 8/2002 |
| JP | 2003-33846 | | 2/2003 |

* cited by examiner

IMMERSION NOZZLE FOR CONTINUOUS CASTING OF STEEL AND CONTINUOUS STEEL CASTING METHOD USING SAME

TECHNICAL FIELD

The present invention relates to a casting nozzle for use with a molten steel vessel, such as ladle or tundish, in a process for continuous casting of molten steel, and more specifically to a continuous casting nozzle comprising a combination of an upper nozzle, a sliding nozzle, an intermediate nozzle, a lower nozzle and a submerged or immersion nozzle. In particular, the present invention relates to an immersion nozzle suitable for continuous casting of clean steel, and a method for continuous casting of clean steel, using the immersion nozzle.

BACKGROUND ART

In a process for continuous casting of aluminum-killed steel, when molten steel is deoxidized by the addition of aluminum, $Al_2O_3$-based inclusions formed in the molten steel adhere and build up onto an inner wall surface of a casting nozzle to cause a nozzle clogging phenomenon where an inner bore diameter of the nozzle is gradually reduced.

This nozzle clogging phenomenon leads directly to shortening of a usable life of the casting nozzle. Moreover, in consequence of the nozzle clogging phenomenon, molten steel flows into a mold at an uneven flow rate to cause drift in the mold, to cause a casting defect due to inclusion of mold powder and bubbles (so-called blowholes). These adverse affects obstruct the continuous casting operation and lead to deterioration in steel quality.

As measures against the nozzle clogging phenomenon, various proposals, such as the use of a material and structure intended to prevent adhesion of $Al_2O_3$, have been made.

As to the use of a material intended to prevent adhesion of $Al_2O_3$, there has been known a technique of inducing a reaction between CaO in a $ZrO_2$—CaO—C refractory material and $Al_2O_3$-based inclusions in molten steel to form a low-melting-point material, and melting a surface of the low-melting-point material in such a manner as to flow down together with the molten steel to obtain an anti-adhesion effect, as disclosed, for example, in the following Patent Publication 1. However, in cases where the cleanness of molten steel is relatively low, this technique cannot achieve a sufficient anti-adhesion effect, because a compound, such as $CaO \cdot 6Al_2O_3$, with a higher melting point than that of molten steel, is formed concurrently with the formation of the low-melting-point material.

As to the structure intended to prevent adhesion of $Al_2O_3$, the following Patent Publication 2 proposes an immersion nozzle for continuous casting. The immersion nozzle comprises a spiral swirl vane disposed in an inner hole thereof and designed to generate a swirling flow in molten steel passing through the inner hole, and a position and dimensions of the spiral swirl vane are adjusted to prevent adhesion of $Al_2O_3$-based inclusions to the spiral swirl vane. In this immersion nozzle, due to a swirling flow generated by the spiral swirl vane, low-density $Al_2O_3$-based inclusions and bubbles are apt to be concentrated in the center of molten steel flow on a downstream side relative to the spiral swirl vane. Thus, the molten steel flow adjacent to an inner wall surface is liable to stagnate in a region of the inner hole ranging from the spiral swirl vane to a position of a molten steel level (secondary meniscus) to cause a problem about increase in adhesion of $Al_2O_3$ to the inner wall in this region.

[Patent Publication 1] Japanese Patent Publication No. 07-34978

[Patent Publication 2] Japanese Patent Laid-Open Publication No. 2003-33846

DISCLOSURE OF THE INVENTION

[Problems that the Invention is to Solve]

In view of the above circumstances, it is an object of the present invention to provide an immersion nozzle for continuous casting of clean steel, capable of generating a swirling flow in molten steel to eliminate drift of molten steel in a mold, based on a spiral swirl vane disposed in an inner hole of the nozzle, and preventing adhesion of $Al_2O_3$-based inclusions to a wall surface of the inner hole while fully achieving the effect of the swirl vane.

It is an another object of the present invention to provide means for reducing an amount of adhesion of $Al_2O_3$-based inclusions to a wall surface of an inner hole of a continuous casting nozzle in contact of molten steel from a molten steel vessel, such as ladle or tundish, in a process for continuous casting of clean steel, such as aluminum-killed steel.

These and other objects, features, and advantages of the present invention will become apparent upon reading the following detailed description along with the accompanying drawings.

[Means for Solving the Problems]

In order to achieve the above objects, the present invention provides an immersion nozzle for continuous casting of steel, having an inner hole provided with a swirl vane for generating a swirling flow in molten steel passing therethrough (hereinafter referred to simply as "swirl vane"). The inner hole is defined by a wall surface (hereinafter referred to as "inner wall surface") adapted to come into contact with the molten steel, and at least a part of the inner wall surface is formed of a refractory layer containing CaO and MgO. The refractory layer is prepared by controlling a weight ratio of each of CaO and MgO in the refractory layer, and an apparent porosity.

In the immersion nozzle of the present invention, the refractory layer constituting the inner wall surface may be formed as a tubular-shaped refractory layer which contains 65 mass % or more of MgO and CaO in a weight ratio of CaO/MgO ranging from 0.4 to 2.3, more preferably 0.6 to 1.5, with the remainder being primarily a carbonaceous material, and has an apparent porosity of 5 to 25% and a thickness of 3 to 20 mm.

In the present invention, the chemical composition of the refractory layer is represented by a value measured after the inner wall surface is subjected to a heat treatment in a reduction atmosphere at a temperature of about 900 to 1200° C.

If a weight ratio of CaO/MgO is less than 0.4, adhesion of $Al_2O_3$-based inclusions is increased to cause a higher risk of the nozzle clogging phenomenon. If a weight ratio of CaO/MgO is greater than 2.3, $CaO \cdot Al_2O_3$ or a low-melting-point material is formed to cause increase in wear of the refractory layer, even though no adhesion of $Al_2O_3$-based inclusions occurs.

When the refractory layer constituting the inner wall surface contains 65 mass % or more of MgO and CaO, with the remainder being primarily a carbonaceous material, such as graphite and resin, the carbonaceous material may be contained in the range of 35 to 1 mass % to provide an inner wall surface excellent in thermal-shock resistance. If a total amount of MgO and CaO is less than 65 mass %, a melting phenomenon of carbon into molten steel is accelerated to cause increase in wear. In order to prevent oxidization, the refractory layer may additionally contain 5mass % or less of at least one selected from the group consisting of $B_4C$, SiC, Al and Si.

Each value of the above components is represented excluding a value of impurities which are inevitably mixed in raw materials.

A raw material of CaO or MgO constituting the nozzle of the present invention may include natural limestone, marble, dolomite ore, slaked lime, magnesia clinker, dolomite clinker, calcia clinker, cement clinker, and fluorine compounds containing calcium ion and/or magnesium ion.

While the refractory layer as a product is more improved in wear resistance and resistance against adhesion of $Al_2O_3$ as it has higher density, an apparent porosity of the refractory layer is preferably in the range of 5 to 25%, more preferably in the range of 10 to 20%. If the refractory layer has an apparent porosity of less than 5%, thermal-shock resistance is deteriorated to cause increase in thermal stress and a higher risk of cracks in a nozzle body. An immersion nozzle using a porous refractory layer with an apparent porosity of greater than 25% cannot withstand long hours of casting operation due to wear caused by abrasion.

A part or the whole of the inner wall surface adapted to come into contact with molten steel may be formed of a tubular-shaped refractory layer containing the above components and having a thickness of 3 to 20 mm, so as to eliminate the nozzle clogging phenomenon. If the refractory layer has a thickness of less than 3 mm, it is difficult to obtain a sufficient anti-clogging effect in long hours of actual casting operation. If the refractory layer has a thickness of greater than 20 mm, heat of molten steel during use is highly likely to cause cracks in the nozzle body pressed by the refractory layer having a larger expansion coefficient than that of the nozzle body.

In the immersion nozzle of the present invention, the swirl vane disposed in the inner hole may be prepared by twisting a tape-shaped refractory material at an angle of 80 to 180 degrees, preferably about 120 degrees, on the basis of a horizontal plane, in such a manner as to be formed in a spiral shape.

The swirl vane may be fixed to the inner wall surface at any suitable position capable of preventing drift of molten steel at an outlet port of the nozzle.

In order to facilitate extracting a die form during forming the nozzle, the inner wall surface is preferably designed to have a slightly tapered shape in a direction from an inlet port toward the outlet port. Further, the inner wall surface may be partially formed with a tier or convex portion for supporting the swirl vane.

In the present invention, inert gas may be injected into molten steel from a gas injection port which is formed in a continuous casting nozzle including an upper nozzle associated with a molten steel vessel, at a position on an upstream side relative to the swirl vane disposed in the inner hole of the immersion nozzle, so as to provide excellent cleaning effect to molten steel based on a synergistic interaction with the anti-drift effect of the swirl vane.

Specifically, according to a centrifugal force arising from the swirling flow in molten steel on the downstream side relative to the swirl vane, and a density difference between the molten steel and each of $Al_2O_3$-based inclusions in the molten steel and gas bubbles formed by the inert gas injected into the molten steel, the gas bubbles and the $Al_2O_3$-based inclusions are readily concentrated in the center of a molten steel flow. This increases a chance of contact between the gas bubbles and the $Al_2O_3$-based inclusions to allow the $Al_2O_3$-based inclusions to be more frequently trapped by the gas bubbles. Further, the bubbling effect makes it possible to facilitate surfacing of the $Al_2O_3$-based inclusions in a mold so as to provide enhanced cleanness in steel.

While the immersion nozzle of the present invention can achieve the anti-adhesion effect on $Al_2O_3$-based inclusions even if only a portion of the inner wall surface on the upstream side relative to the swirl vane is formed of the tubular-shaped refractory layer, the refractory layer may be formed to serve as the entire inner wall surface including a portion of the inner wall surface on a downstream side relative to the swirl vane. Further, the gas may be injected into molten steel flowing through the continuous casting nozzle including the upper nozzle associated with the molten steel vessel, at a position on the upstream side relative to the swirl vane.

A material of the swirl vane used in the present invention is not limited to a specific one. For example, the material of the swirl vane may include alumina-carbon based, alumina-silica-carbon based, zirconia-carbon based, magnesia-carbon based, magnesia-lime-carbon based and magnesia-lime based materials.

The immersion nozzle body may be made of a commonly-used refractory material having a primary component comprising carbon and at least one selected from the group consisting of alumina, zirconia and magnesia.

Further, a powder-line portion of the immersion nozzle may be made of a commonly-used zirconia-carbon-based material.

According to the present invention, a combination of the tubular-shaped refractory layer, the swirl vane and the inert gas injection makes it possible to effectively prevent adhesion of $Al_2O_3$-based inclusions while reliably maintaining an effect of eliminate drift of molten steel in a mold, so as to achieve enhanced cleanness in steel, stabilization in casting operation and enhancement and stabilization in steel quality. This largely contributes to reduction in production cost.

In addition, when the inert gas injection is combined with the tubular-shaped refractory layer and the swirl vane, an amount of inert gas to be injected can be reduced as compared with a case where the inert gas injection is implemented without being combined with the tubular-shaped refractory layer and the swirl vane. Thus, steel defects due to inert gas can be reduced to further accelerate enhancement and stabilization in steel quality and reduction in production cost.

BEST MODE FOR CARRYING OUT THE INVENTION

With reference to the accompanying drawings, an embodiment of the present invention will now be described.

FIRST EMBODIMENT

FIG. 1 is a sectional view showing an immersion nozzle 1 according to a first embodiment of the present invention. The immersion nozzle 1 comprises a swirl vane 4 disposed in an inner hole thereof, and a tubular-shaped refractory layer 3 serving as a portion of a wall surface of the inner hole on an upstream side relative to the swirl vane.

In FIG. 1, the reference numeral 2 indicates a powder-line portion for protecting corrosion due to mold powder which is a heat insulting material for molten steel in an immersion region. In a state when the immersion nozzle 1 is immersed in molten steel, the swirl vane 4 is disposed in the inner hole at an appropriate position above or on the upstream side relative to the powder-line portion 2, while comprehensively taking into account dimensions of the nozzle, such as a length between a molten-steel inlet port 5 and a molten-steel outlet port 6, and a diameter of the inner hole, so as to prevent drift of molten steel at the outlet port 6.

SECOND EMBODIMENT

FIG. 2 is a sectional view showing an immersion nozzle 1 according to a second embodiment of the present invention. This immersion nozzle 1 has an inner hole defined by a wall surface which is adapted to come into contact with molten steel passing therethrough, and entirely formed of a tubular-shaped refractory layer 3. Further, a swirl vane 4 is disposed in the inner hole on the upstream side relative to a powder-line portion 2.

THIRD EMBODIMENT

FIG. 3 is a sectional view showing an immersion nozzle 1 according to a third embodiment of the present invention. In the third embodiment, this immersion nozzle 1 is provided with a gas injection port 7 disposed adjacent to a molten-steel inlet port 5, and attached to an upper nozzle 12 fixed to a bottom of a molten steel vessel 13.

In the third embodiment, inert gas is fed from a gas feed port 8 formed in an outer wall of an upper portion of the immersion nozzle 1, and injected into molten steel from the gas injection port 7 through a slit 9 formed on the side of a back surface of a tubular-shaped refractory layer 3. The gas injection port 7 is formed of a gas-previous refractory member, such as a porous refractory member or a refractory member having a through-hole.

While the swirl vane 4 and the tubular-shaped refractory layer 3 in each of the first to third embodiments are disposed in the inner hole of the immersion nozzle 1, they may be disposed at any other suitable position of a molten-steel flow passage of an intermediate nozzle (lower nozzle) 10, a sliding nozzle plate 11 or the upper nozzle 12 (see FIG. 3).

When the swirl vane 4 and/or the tubular-shaped refractory layer 3 are disposed in the molten-steel flow passage of the upper nozzle 12, they may be made of a porous material in their entirety, as in the gas injection port 7.

A casting test was carried out using each of the immersion nozzles illustrated in FIGS. 1 to 3. The test result is shown in the following Tables 1 to 4.

An immersion nozzle body in each sample of the immersion nozzles in FIGS. 1 to 3 was made of an alumina-silica-carbon-based refractory material consisting of 41 mass % of $Al_2O_3$, 28 mass % of $SiO_2$ and 31 mass % of C.

Extremely-low-carbon aluminum-killed steel containing 30 ppm of C, 0.03 mass % of Si, 0.7 mass % of Mn, 0.01 mass % of P, 0.01 mass % of S and 0.05 mass % of Al was used as molten steel for this casting test. In each of the immersion nozzles, a casting time was set at 250 minutes. A composition of each sample subjected to the test, a thickness of adhered $Al_2O_3$-based inclusions and a level of wear in the inner wall surface adjacent to the outlet port after the test, and a temperature difference $\Delta T$, causing cracks in connection with thermal shock applied to the sample, were checked.

Table 1 shows a relationship of $Al_2O_3$ buildup rate, evaluation of $Al_2O_3$ buildup level and thermal-shock temperature $\Delta T$, using a CaO/MgO weight ratio as a parameter, in each sample of the immersion nozzles illustrated in FIGS. 1 and 2.

TABLE 1

|  |  | Comparative Sample | | Inventive Sample | | | | | Comparative Sample | |
|---|---|---|---|---|---|---|---|---|---|---|
|  |  | 1 | 2 | 1 | 2 | 3 | 4 | 5 | 3 | 4 |
| CaO + MgO total weight ratio | | 100 | 100 | 100 | 100 | 100 | 100 | 100 | 100 | 100 |
| CaO/MgO weight ratio | |  | 0.3 | 0.4 | 0.6 | 1.0 | 1.5 | 2.4 | 3.0 |  |
| Chemical composition | MgO (mass %) | 99.0 | 74.5 | 69.5 | 61.9 | 49.5 | 39.6 | 29.5 | 24.5 |  |
|  | CaO (mass %) |  | 24.5 | 29.5 | 37.1 | 49.5 | 59.4 | 69.5 | 74.5 | 99.0 |
|  | C (mass %) | 1.0 | 1.0 | 1.0 | 1.0 | 1.0 | 1.0 | 1.0 | 1.0 | 1.0 |
| measurement | alumina buildup rate (mm/min) | 0.23 | 0.1 | 0.03 | 0.001 | 0.001 | 0 | −0.01 | −0.2 | −0.8 |
|  | evaluation of buildup level | thick buildup | adhesion | Good | Good | Good | Good | Good | wear | wear |
|  | thermal shock resistance (temperature difference $\Delta T$)* | 500 | 520 | 550 | 550 | 600 | 600 | 680 | 780 | 850 |

*Sample: cylindrical shape of Φ120/Φ80

As seen in Table 1, each of Inventive Samples 1 to 5 had a small adhesion of $Al_2O_3$-based inclusions and kept in a good state in all items. In contrast, each of Comparative Samples 1 and 2 having a CaO/MgO weight ratio of 0.3 or less had a high $Al_2O_3$ buildup rate. While each of Comparative Samples 3 and 4 having a CaO/MgO weight ratio of greater than 2.3 had no $Al_2O_3$ adhesion, they exhibited increase in wear. As to a temperature difference $\Delta T$ causing cracks due to thermal shock, each of Samples had a low value of 1000° C. or less because of a relatively low content of carbon, and there was no substantial difference therebetween.

TABLE 2

|  |  | Comparative Sample | | Inventive Sample | | |
|---|---|---|---|---|---|---|
|  |  | 5 | 6 | 6 | 7 | 8 |
| CaO + MgO total weight ratio | | 55.0 | 60.0 | 65.0 | 85.0 | 95.0 |
| CaO/MgO weight ratio | | 1.0 | 1.0 | 1.0 | 1.0 | 1.0 |
| Chemical composition | MgO (mass %) | 27.5 | 30.0 | 32.5 | 42.5 | 47.5 |
| | CaO (mass %) | 27.5 | 30.0 | 32.5 | 42.5 | 47.5 |
| | C (mass %) | 45.0 | 40.0 | 35.0 | 15.0 | 5.0 |
| measurement | alumina buildup rate (mm/min) | −0.8 | −0.3 | −0.1 | −0.03 | −0.01 |
| | evaluation of buildup level | large wear | large wear | Good | Good | Good |
| | thermal shock resistance (temperature difference ΔT)* | >1500 | >1500 | 1350 | 1100 | 1000 |

*Sample: cylindrical shape of Φ120/Φ80

Table 2 shows the result of a test using Samples each having a CaO/MgO weight ratio fixed at 1 and a different carbon content. As seen in Table 2, Sample having a carbon content of 5 mass % or more exhibits a temperature difference ΔT of 1000° C. or more. In particular, Inventive Samples 6 to 8 having a carbon content of 35 mass % or less or a total mass % of CaO and MgO of 65 mass % or more had neither wear nor $Al_2O_3$ adhesion and exhibited a well-balanced state. In contrast, each of Comparative Samples 5 and 6 having an excessively high carbon content exhibited severe wear due to reaction between carbon and molten steel during an $Al_2O_3$ buildup test.

TABLE 3

|  |  | Inventive Sample | | | Comparative Sample | | |
|---|---|---|---|---|---|---|---|
|  |  | 7 | 9 | 10 | 7 | 8 | 9 |
| CaO + MgO total weight ratio | | 85.0 | 85.0 | 85.0 | 85.0 | 85.0 | 85.0 |
| CaO/MgO weight ratio | | 1.0 | 1.0 | 1.0 | 1.0 | 1.0 | 1.0 |
| Chemical composition | MgO (mass %) | 42.5 | 42.5 | 42.5 | 42.5 | 42.5 | 42.5 |
| | CaO (mass %) | 42.5 | 42.5 | 42.5 | 42.5 | 42.5 | 42.5 |
| | C (mass %) | 15.0 | 15.0 | 15.0 | 15.0 | 15.0 | 15.0 |
| measurement | apparent porosity (%) | 5 | 14 | 25 | 28 | 35 | 3 |
| | alumina buildup rate (mm/min) | −0.03 | −0.05 | −0.08 | −0.15 | −0.4 | −0.03 |
| | evaluation of buildup level | Good | Good | Good | wear | wear | Good |
| | thermal shock resistance (temperature difference ΔT)* | 1100 | 1150 | 1200 | 1300 | 1350 | 900 |

*Sample: cylindrical shape of Φ120/Φ80

Table 3 shows the result of an $Al_2O_3$ buildup test using samples prepared by using a composition of Inventive Sample 7 and changing a forming pressure from 300 to 2500 kg/cm$^2$ to have different apparent porosities after burning under a reduction atmosphere at a temperature of 1000° C. Inventive Samples 7, 9 and 10 having an apparent porosity of 25% or less had no $Al_2O_3$ adhesion based on a slight wear and kept in a good state. In contrast, Comparative Samples 7 and 8 having an apparent porosity of 28% or more exhibited large wear even though no $Al_2O_3$ adhesion was observed. Comparative Sample 9 having an apparent porosity of 3% exhibited poor thermal-shock resistance even through it had no problem in terms of wear and $Al_2O_3$ adhesion.

TABLE 4

|  | Comparative Sample 10 | Inventive Sample 11 |
|---|---|---|
| Nozzle Structure | FIG. 3 | FIG. 3 |
| Amount of Argon Gas | 0 | 3 NL/min |
| Amount of Alumina Inclusions in Slab (Index) | 100 | 40 |

The above Table 4 shows the result of a test where the immersion nozzle illustrated in FIG. 3 having the refractory layer of Inventive Sample 7 in Table 3 was used, and inert gas was injected into the molten steel from the gas injection port made of a gas-previous refractory material and disposed on an upstream side relative to the swirl vane.

Given that an amount of $Al_2O_3$-based inclusions in slab cast by injecting no argon gas is 100 as shown in Comparative Sample 10, an amount of $Al_2O_3$-based inclusions in slab cast by injecting argon gas at 3 NL/min was reduced to 40% as shown in Inventive Sample 11.

In a casting operation using an immersion nozzle having the refractory layer of Inventive Sample 7, the immersion nozzle could stably maintained an effect of the swirl vane during the entire period of the casting operation without adhesion of $Al_2O_3$-based inclusions and the nozzle-clogging phenomenon, and a product could be obtained without surface and internal defects. Further, when inert gas was injected into molten steel from the gas injection port made of a gas-previous refractory material and disposed on an upstream side relative to the swirl vane, an amount of $Al_2O_3$-based inclusions was drastically reduced, and a high-quality product free of surface and internal defects could been obtained.

In contrast, when only the swirl vane was used without using the refractory layer, $Al_2O_3$-based inclusions built up onto the swirl vane and the inner wall surface on the upstream side of the swirl vane in the form of a layer having a thickness of 7 to 8 mm to obstruct a stable casting operation.

INDUSTRIAL APPLICABILITY

According to the present invention, in a process for continuous casting of molten steel, using a casting nozzle comprising a combination of an upper nozzle, a sliding nozzle, a nozzle, a lower or intermediate nozzle and an immersion nozzle, associated with a molten steel vessel, such as ladle or tundish, the tubular-shaped refractory layer formed in each of the nozzles to serve as at least a part of an inner wall surface thereof adapted to come into contact with molten steel can prevent occurrence of a nozzle clogging phenomenon, and a portion of the refractory layer formed on an upstream side of the swirl vane disposed in an inner hole of the immersion nozzle can prevent adhesion of $Al_2O_3$-based inclusions to the swirl vane due to stagnation of a molten steel flow in the inner hole around a molten steel level (secondary meniscus). Based on synergistic effects with bubbling, the present invention is suitably used in continuous casting of clean steel.

DESCRIPTION OF THE REFERENCE NUMERALS AND SIGNS

Figure 1:
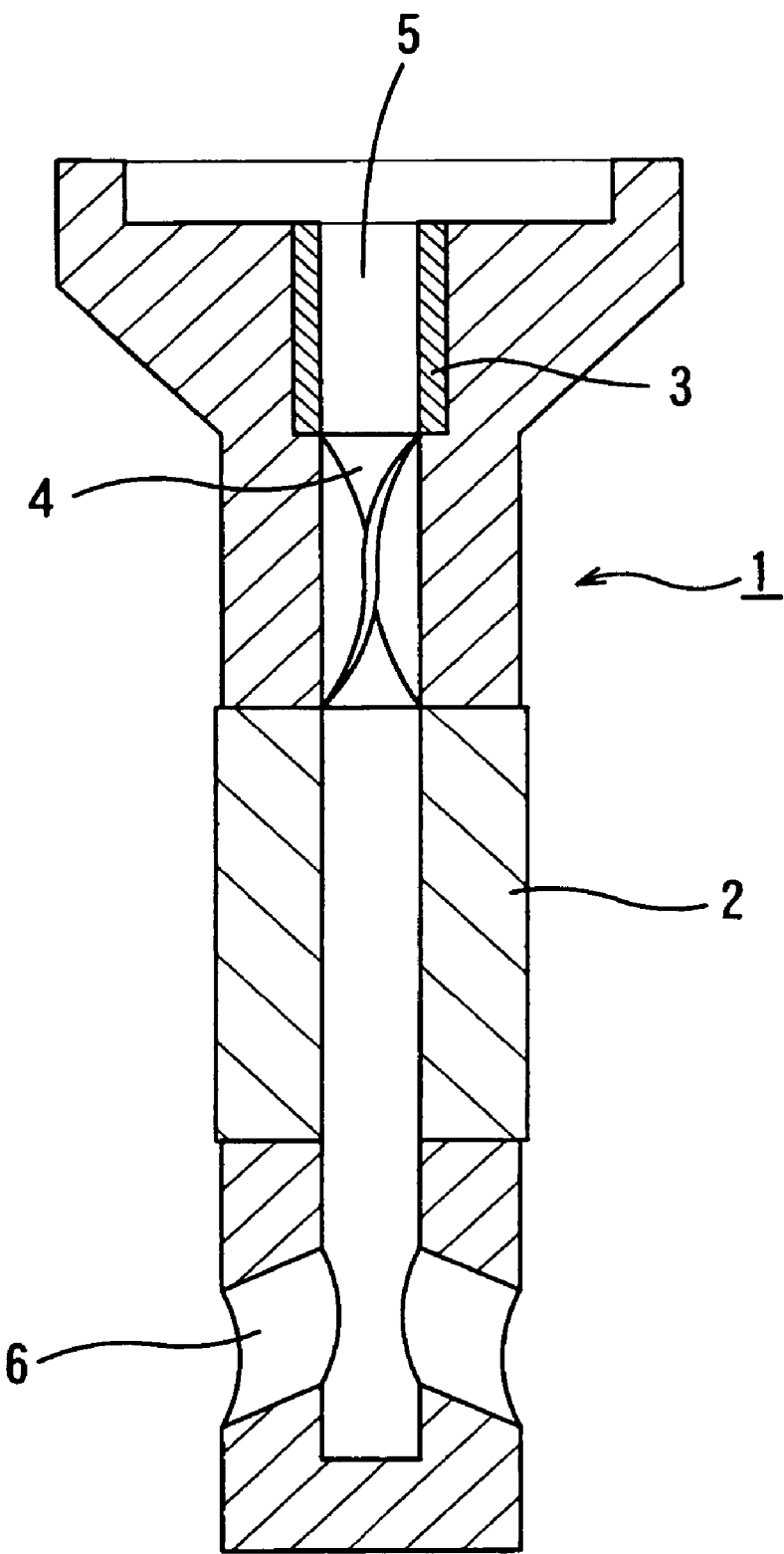
FIG. 1 is a sectional view showing an immersion nozzle according to one embodiment of the present invention, wherein the immersion nozzle comprises a swirl vane disposed in an inner hole thereof, and a tubular-shaped refractory layer serving as a portion of a wall surface of the inner hole on an upstream side relative to the swirl vane.
Figure 2:
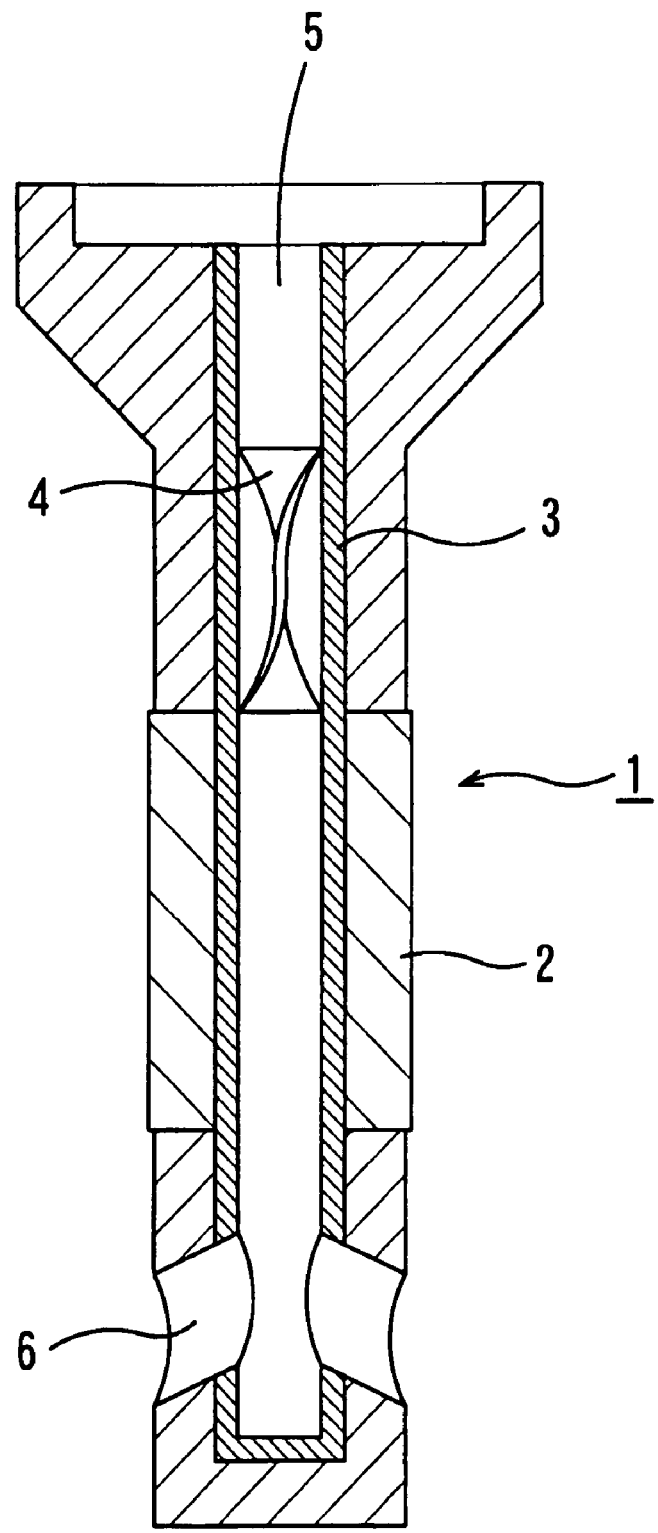
FIG. 2 is a sectional view showing an immersion nozzle according to another embodiment of the present invention, wherein the immersion nozzle comprises a tubular-shaped refractory layer serving as the entire wall surface of an inner hole thereof, and a swirl vane disposed in the inner hole.
Figure 3:
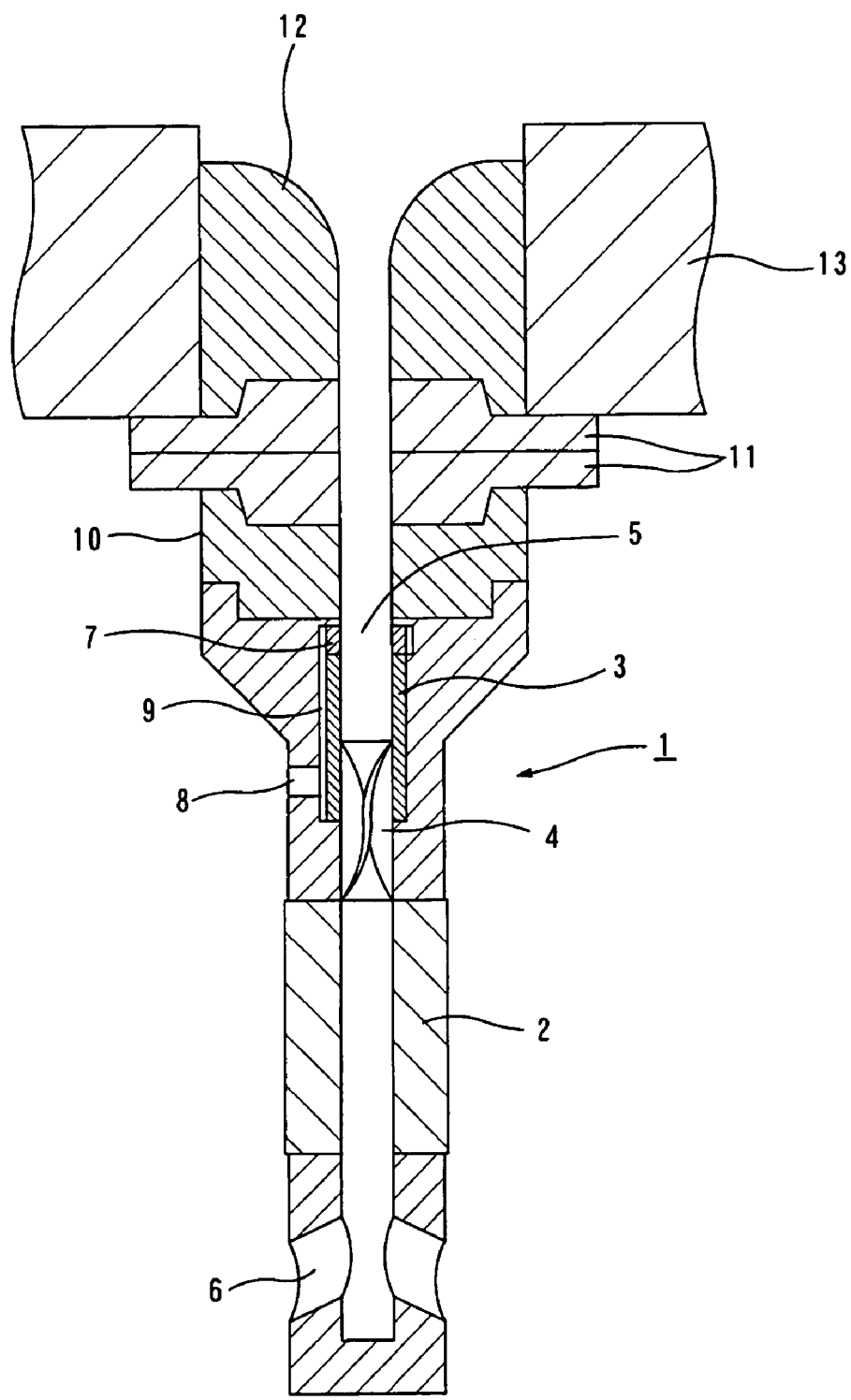
FIG. 3 is a sectional view showing an immersion nozzle according to yet another embodiment of the present invention, wherein the immersion nozzle comprises a swirl vane disposed in an inner hole thereof, a tubular-shaped refractory layer serving as a portion of a wall surface of the inner hole on an upstream side of the swirl vane, and an inert-gas injection port disposed on the upstream side relative to the swirl vane.

1: immersion nozzle
2: powder-line portion
3: tubular-shaped refractory layer
4: swirl vane
5: molten-steel inlet port
6: molten-steel outlet port
7: gas injection port
8: gas feed port
9: slit
10: intermediate nozzle (lower nozzle)
11: sliding nozzle plate
12: upper nozzle
13: molten steel vessel

What is claimed is:

1. An immersion nozzle for continuous casting of steel, said nozzle comprising:
   a wall surface defining an inner hole to allow molten steel to flow through said inner hole;
   a swirl vane disposed in said inner hole for generating a swirling flow in the molten steel passing by said swirl vane; and
   a refractory layer containing CaO and MgO forming at least a part of said wall surface upstream of said swirl vane, said refractory layer being prepared by controlling a weight ratio of each of CaO and MgO in said refractory layer and an apparent porosity.

2. The immersion nozzle according to claim 1, wherein:
   said CaO-MgO-containing refractory layer contains a carbonaceous material;
   a sum of MgO and CaO in said refractory layer is at least 65 mass %; and
   a weight ratio of CaO to MgO is in the range of 0.4:1 to 2.3:1.

3. The immersion nozzle according to claim 2, wherein said CaO-MgO-containing refractory layer is formed as a tubular-shaped refractory layer having an apparent porosity of 5 to 25% and a thickness of 3 to 20 mm.

4. The immersion nozzle according to claim 2, wherein said carbonaceous material forms from 1 to 35 mass percent of said CaO-MgO-containing refractory layer.

5. The immersion nozzle according to claim 2, wherein said CaO-MgO-containing refractory layer contains no more than 5 mass % of at least one antioxidant selected from the group consisting of $B_4C$, SiC, Al, and Si.

6. The immersion nozzle according to claim 1, wherein said swirl vane has a spiral shape and is formed by a twisted tape of refractory material, said tape being twisted at an angle of 80 to 180 degrees to a horizontal plane.

7. The immersion nozzle according to claim 1, wherein:
   said wall surface is partially formed with a tier; and
   said swirl vane is fixed to said tier.

8. The immersion nozzle according to claim 1, wherein said wall surface has a gas injection port formed therein; said gas injection port being disposed upstream said swirl vane.

9. The immersion nozzle according to claim 1, wherein said CaO-MgO-containing refractory layer covers an entirety of said wall surface including a portion of said wall surface downstream said swirl vane.

10. The immersion nozzle according to claim 1, wherein said swirl vane is disposed in said inner hole upstream a powder line.

11. The immersion nozzle according to claim 8, wherein:
   said wall surface has a slit formed therein behind said refractory layer connected to said gas injection port; and
   said wall surface has a gas feed port formed therein connected to said slit, said gas feed port, said slit, and said gas injection port being configured to feed a gas inert relative to steel into the molten steel passing through said inner hole.

12. A method for continuous casting of steel, which comprises:
   providing an immersion nozzle according to claim 1; and
   flowing molten steel through said immersion nozzle.

13. A method for continuous casting of steel, which comprises:
   providing an immersion nozzle according to claim 8;
   flowing molten steel through said immersion nozzle; and
   injecting inert gas into the molten steel passing through said inner hole via said gas injection port.

14. The immersion nozzle according to claim 1, wherein:
   said wall surface is partially formed with a convex portion; and
   said swirl vane is fixed to said convex portion.

15. The immersion nozzle according to claim 11, wherein said refractory layer is tube shaped.

16. The method according to claim 12, wherein the molten steel is clean.

17. The method according to claim 13, wherein the molten steel is clean.

18. The method according to claim 13, which further comprises positioning a molten steel vessel for supplying the molten steel upstream said swirl vane and said gas injection port.

* * * * *